(12) United States Patent
Frenken et al.

(10) Patent No.: US 11,285,596 B2
(45) Date of Patent: Mar. 29, 2022

(54) WORKING TOOL

(71) Applicant: GUSTAV KLAUKE GMBH, Remscheid (DE)

(72) Inventors: Egbert Frenken, Heinsberg (DE); Andreas Lehr, Neuss (DE)

(73) Assignee: GUSTAV KLAUKE GMBH, Remscheid (DE)

( * ) Notice: Subject to any disclaimer, the term of this patent is extended or adjusted under 35 U.S.C. 154(b) by 351 days.

(21) Appl. No.: 16/339,609

(22) PCT Filed: Oct. 5, 2017

(86) PCT No.: PCT/EP2017/075333
§ 371 (c)(1),
(2) Date: Apr. 4, 2019

(87) PCT Pub. No.: WO2018/065513
PCT Pub. Date: Apr. 12, 2018

(65) Prior Publication Data
US 2019/0240826 A1 Aug. 8, 2019

(30) Foreign Application Priority Data

Oct. 7, 2016 (DE) .................... 10 2016 119 050.0
Jun. 7, 2017 (DE) .................... 10 2017 112 480.2

(51) Int. Cl.
*B25F 5/00* (2006.01)
*B25B 27/10* (2006.01)
(Continued)

(52) U.S. Cl.
CPC ............ *B25F 5/005* (2013.01); *B23D 29/002* (2013.01); *B25B 27/023* (2013.01);
(Continued)

(58) Field of Classification Search
CPC ........ B25F 5/005; B25F 5/006; B25F 27/026; B25F 5/02; B25B 27/10; B25B 27/026;
(Continued)

(56) References Cited

U.S. PATENT DOCUMENTS 2,802,455 A * 8/1957 Ingres .................. B60T 13/244
91/373
4,949,827 A * 8/1990 Leigh-Monstevens ......................
F16D 25/087
192/85.51
(Continued)

FOREIGN PATENT DOCUMENTS

DE          20113238 U1   11/2001
DE   10 2005 047 353 A1   5/2007
(Continued)

OTHER PUBLICATIONS

International Search Report for corresponding international patent application No. PCT/EP2017/075333 dated Jan. 3, 2018, 4 pages.
(Continued)

*Primary Examiner* — Ghassem Alie
(74) *Attorney, Agent, or Firm* — Klintworth & Rozenblat IP LLP

(57) ABSTRACT

A working tool has a working head and a body device. In an embodiment, an electric motor having a drive shaft with a longitudinal axis, and a transmission are connected to each other and are in the body device. In an embodiment, the working head is a hydraulic cylinder with a hydraulic piston that can be moved between extended and retracted positions in a direction of travel. A hydraulic medium pump and a drive for the hydraulic medium are provided in the body device. In an embodiment, the transmission is connected to the electric motor so as to be movable in the direction of the longitudinal axis in such a way that it is limited by a limit stop. In an embodiment, the hydraulic cylinder is attached to
(Continued)

the body device so as to be movable in the direction of travel that it is limited by a limit stop.

19 Claims, 10 Drawing Sheets

(51) Int. Cl.
*B25B 27/02* (2006.01)
*H01R 43/042* (2006.01)
*B23D 29/00* (2006.01)

(52) U.S. Cl.
CPC ............ *B25B 27/026* (2013.01); *B25B 27/10* (2013.01); *B25F 5/006* (2013.01); *H01R 43/0421* (2013.01); *H01R 43/0427* (2013.01); *H01R 43/0428* (2013.01)

(58) Field of Classification Search
CPC .......................... B25B 21/02; H01R 43/0421; H01R 43/0428; H01R 43/0427; B23D 29/002; F15B 15/1447; F15B 15/226; F15B 15/225; F15B 15/204; B24B 23/028
USPC ........ 83/525; 30/228; 172/2, 48, 162.2, 176, 172/178, 201, 216; 92/70, 12.2; 60/487
See application file for complete search history.

(56) References Cited

U.S. PATENT DOCUMENTS

| | | | |
|---|---|---|---|
| 7,412,868 B2 | 8/2008 | Frenken | |
| 2009/0283282 A1* | 11/2009 | Zimmermann | B25D 17/043 173/162.2 |
| 2011/0011608 A1 | 1/2011 | Saur | |
| 2012/0118599 A1* | 5/2012 | Schadow | B25F 5/006 173/162.2 |
| 2015/0251256 A1 | 9/2015 | Frenken | |
| 2016/0185322 A1 | 6/2016 | Vierkotten et al. | |
| 2018/0319000 A1 | 11/2018 | Frenken et al. | |

FOREIGN PATENT DOCUMENTS

| | | |
|---|---|---|
| DE | 10 2013 007 869 A1 | 11/2014 |
| WO | 03/84719 A2 | 10/2003 |
| WO | 2017/080877 A1 | 10/2003 |
| WO | 2014/009363 A1 | 1/2014 |

OTHER PUBLICATIONS

Written Opinion for corresponding international patent application No. PCT/EP2017/075333 dated Jan. 3, 2018, 6 pages.
Machine translation of DE20113238.
English machine translation of WO2017080877.

* cited by examiner

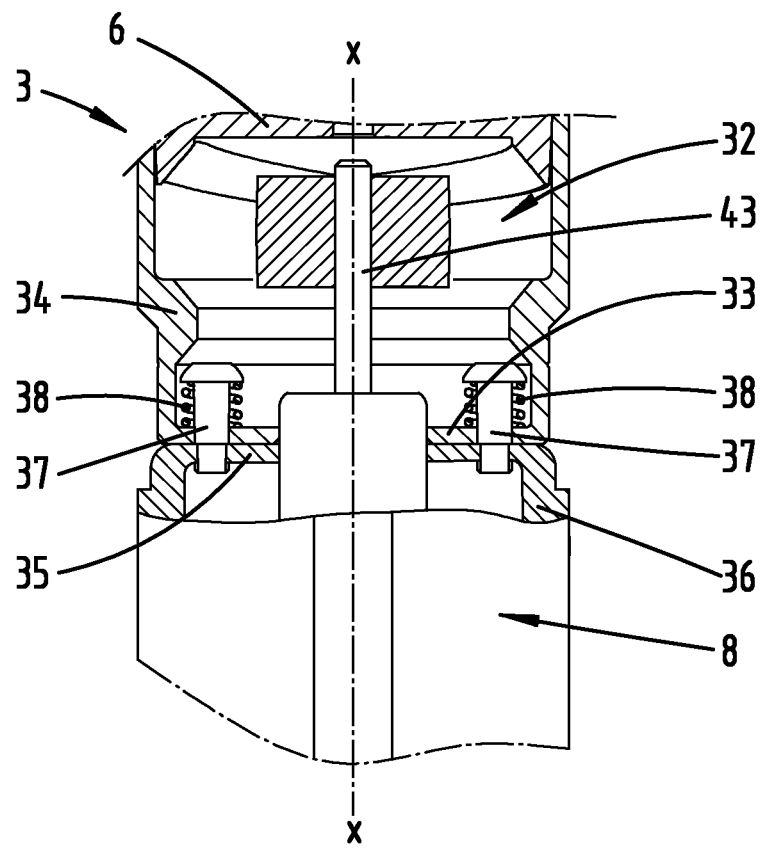
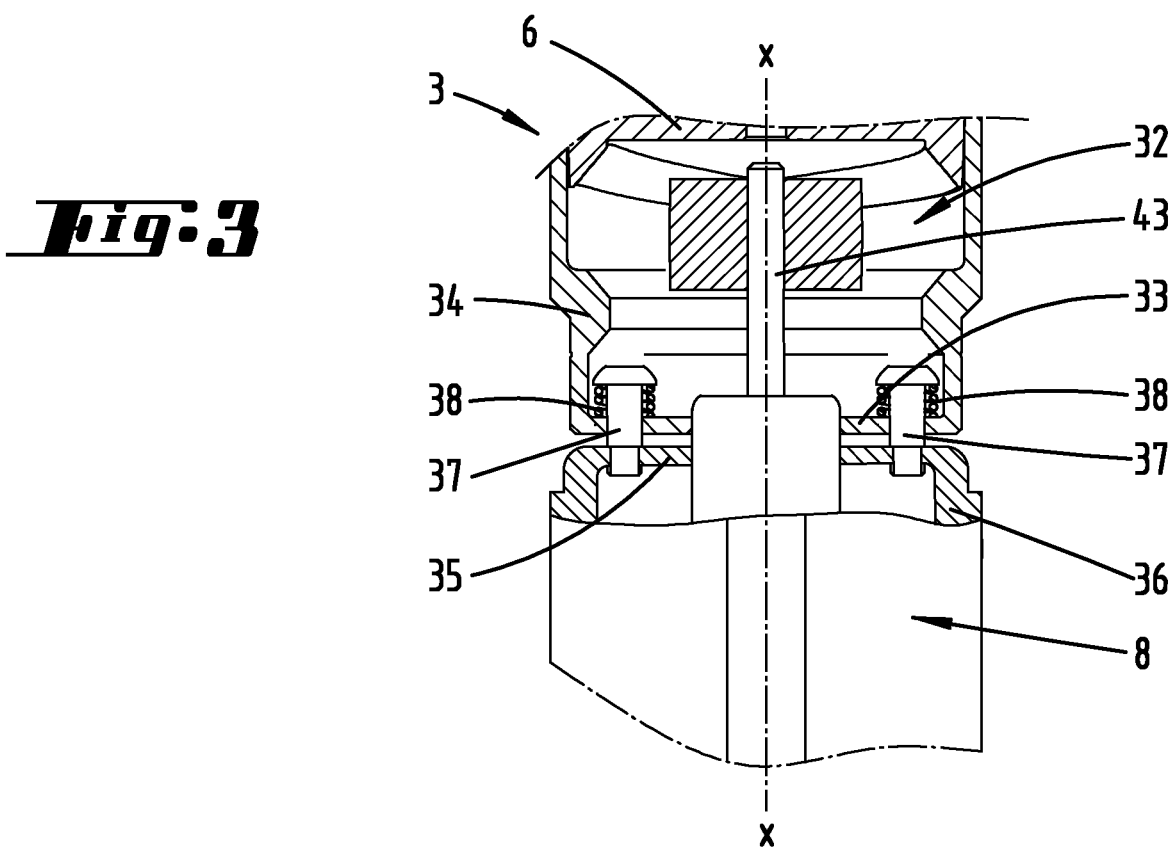

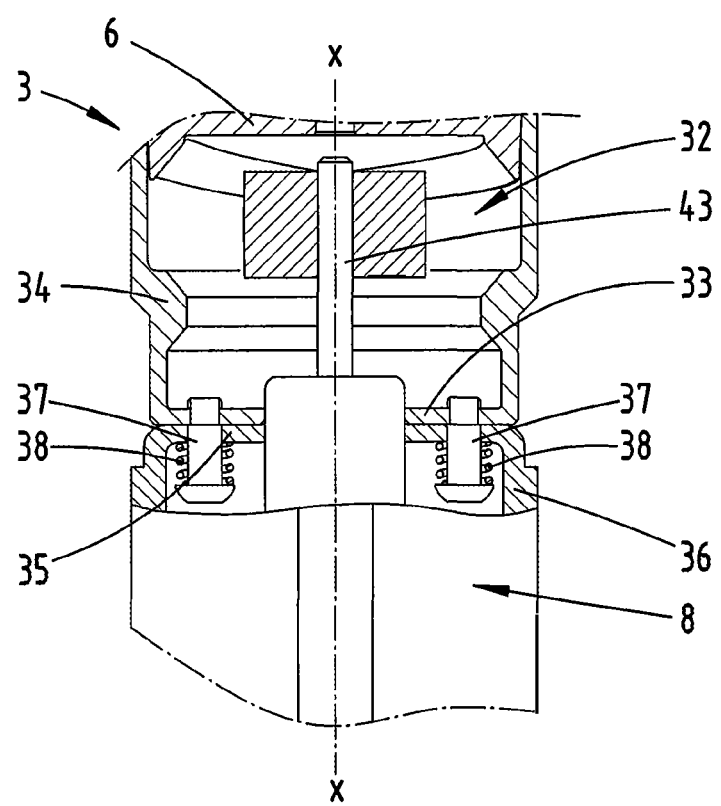

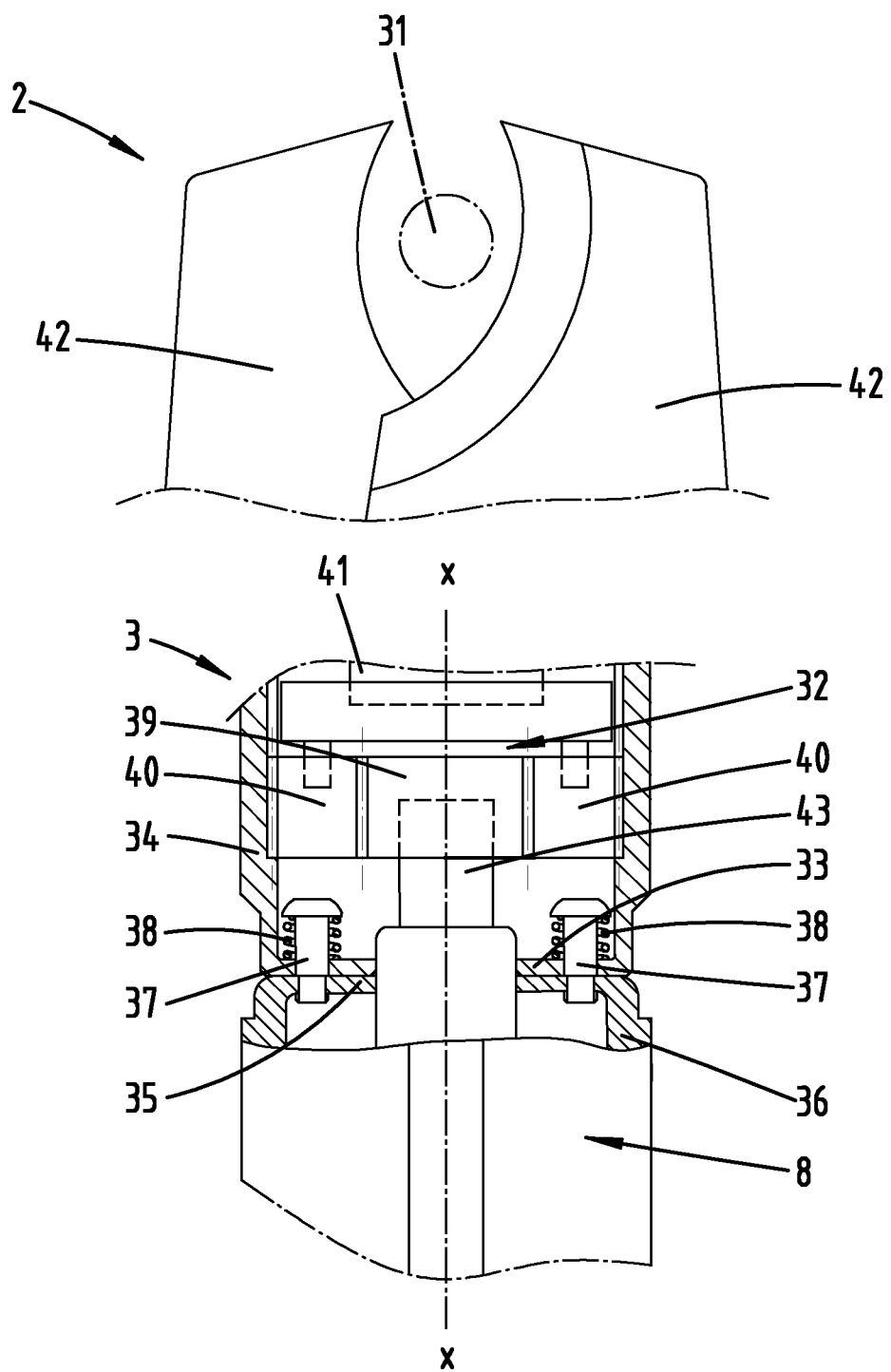

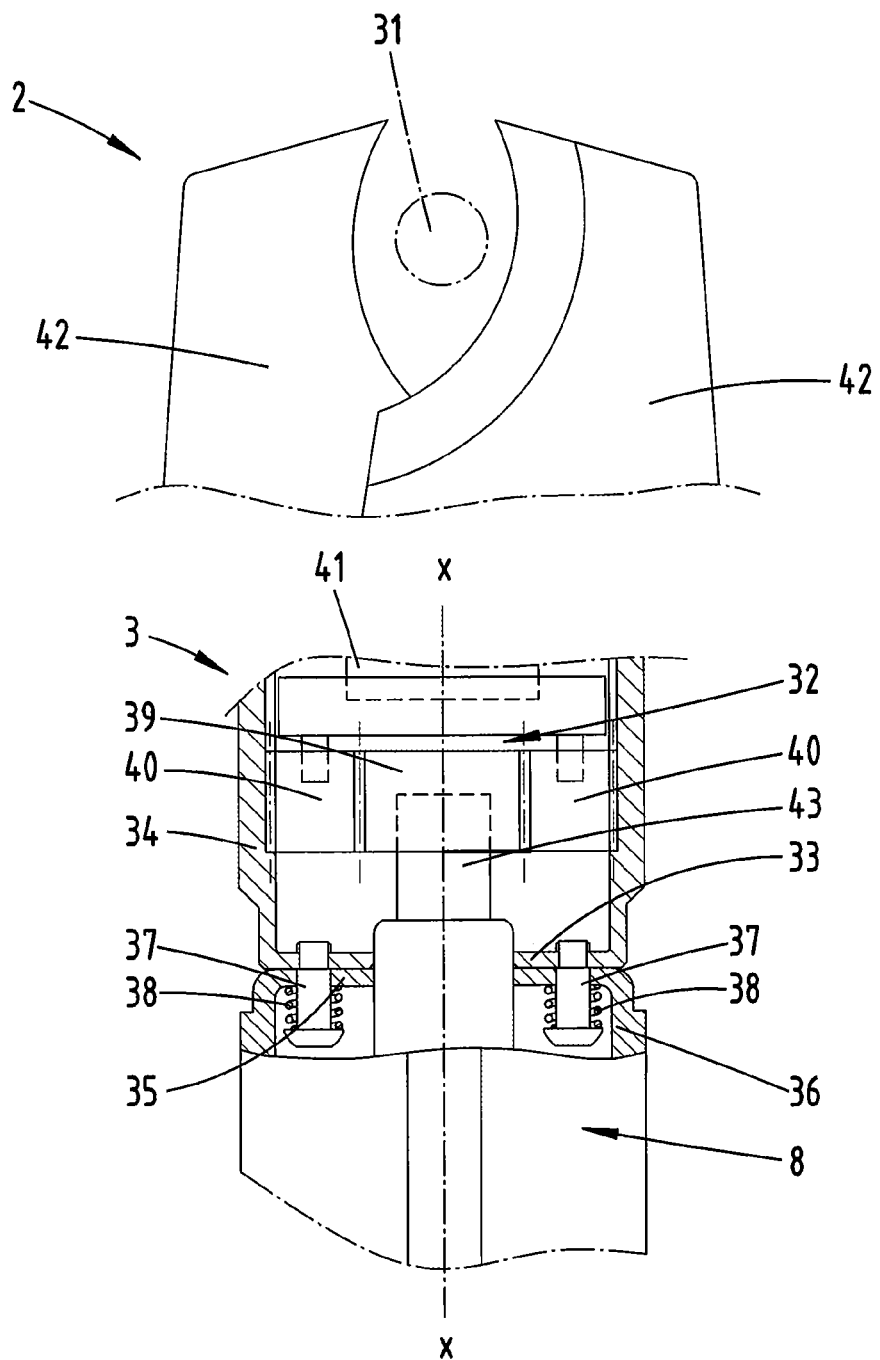

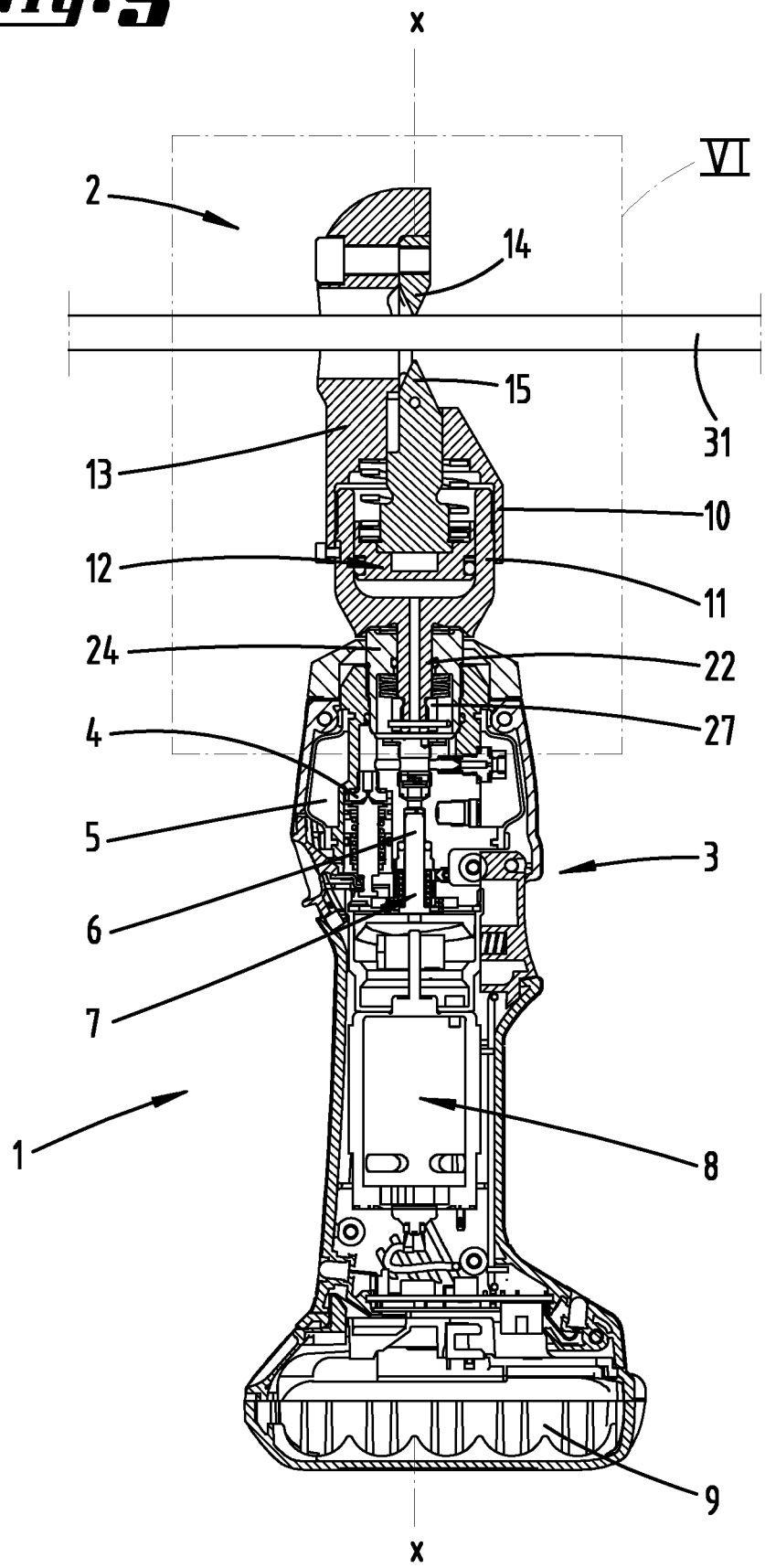

WORKING TOOL

TECHNICAL FIELD

The invention pertains to a working tool according to the characteristic features of the preamble of claim 1 and according to the characteristic features of the preamble of claim 2.

The invention furthermore pertains to a hydraulic working tool with a working head and a body device, wherein the working head comprises a hydraulic cylinder with a hydraulic piston, which can be displaced between a retracted position and an extended position in a direction of travel, and wherein a hydraulic medium pump and a drive for the hydraulic medium pump are additionally provided in the body device; see also the preamble of claim 7.

PRIOR ART

Working tools of the type in question are generally known, for example, in the form of hydraulic working tools for cutting relatively thick wires or for punching or cutting, e.g., metal sheets. In this context, we refer, for example, to WO 2003/084719 A2 (U.S. Pat. No. 7,412,868 B2). In this case, a pressure of 300 bar and more, e.g. up to 600 bar or 800 bar, can be generated in the impingement chamber by means of the hydraulic medium as a result of a counterpressure of cutting edges or punching jaws.

Furthermore, purely mechanical working tools, e.g. with a spindle drive, are also known. In this context, we refer, for example, to WO 2014/009363 A1 (US 2015/0251256 A1).

DE 10 2005 047 353 A1 discloses an electric machine tool with a damping device, which generates a damping effect between the electric motor and the transmission during a motion in both possible axial directions. DE 201 13 238 U1 should furthermore be mentioned with respect to the prior art. This publication discloses a hydraulic working tool with a working head and a body device, wherein the working head comprises a hydraulic cylinder with a hydraulic piston, which can be displaced between a retracted position and an extended position in a direction of travel. A hydraulic medium pump and a drive for a hydraulic medium pump are furthermore provided in the body device. This publication forms the starting point of the invention according to claim 7.

DE 10 2013 007 869 A1 ultimately discloses a supporting leg of a vehicle with a boom, wherein the supporting leg comprises a hydraulic cylinder that acts upon a cover of an outer tube, in which the hydraulic cylinder acts, by means of a spring.

Based on the prior art according to DE 10 2005 047 353 A1, the invention aims to respectively disclose a working tool of the initially described type and a hydraulic working tool of the initially described type, which have an advantageous design with respect to potentially occurring pressure shocks.

This objective is attained with the object of claim 1, which is characterized in that a housing bottom of a housing of the transmission abuts in an unaffected home position on a ceiling of a housing of the electric motor in such a way that its motion is limited by a limit stop, in that a driveshaft of the electric motor extends through the ceiling, as well as the bottom, in order to engage into the transmission region, in that the connection is realized by means of a pin, which is anchored in one of the components and relative to which the other component is movable in such a way that its motion is limited by a limit stop, wherein the transmission is guided in the longitudinal direction of the axis on the pin extending through the bottom, and in that the movability is realized against a spring force of a spring.

This objective is furthermore attained with the object of claim 7, which is characterized in that the hydraulic cylinder is attached to the body device so as to be movable in the direction of travel in such a way that its motion is limited by a limit stop.

SUMMARY OF THE INVENTION

Based on the known prior art, the invention aims to additionally enhance a working tool of the type in question.

According to a first inventive idea, this objective is potentially attained with a working tool, in which the transmission is connected to the electric motor so as to be movable in the direction of the longitudinal axis in such a way that its motion is limited by a limit stop.

In the course of the pressure buildup, e.g. in an embodiment of the working tool in the form of a cutting device, the working head moves relative to the body device, in a hydraulic tool together with the hydraulic cylinder, along the geometric longitudinal axis of the respective driveshaft or drive spindle or in the direction of travel of the hydraulic piston. Upon the transection of the part to be cut or a potential brittle fracture of the part to be cut, the driving means (for example the spindle or the hydraulic piston) and the displaceable tool (cutting die) fastened thereon jointly carry out a sudden motion in the direction of travel toward the opposite stationary tool (cutting die) due to the previously acting high pressure. In this case, a collision of the tools, particularly cutting tools, can and may occur.

In hydraulic working tools, the hydraulic cylinder may also have a tendency to move in the direction of the body device, i.e. opposite to the direction of travel, due to the decompression of the hydraulic medium. The hydraulic cylinder can ultimately abut on the corresponding facing surface of the body device.

Sudden force effects of the type potentially occurring, for example, during a brittle fracture in the course of a cutting process are absorbed due to the fact that the movable connection between the transmission and electric motor is limited by a limit stop, wherein the transmission may be a mechanical transmission such as a gearing, e.g. a planetary gearing, but also a transmission in the form of a hydraulic pump. These force effects preferably are not transmitted onward, at least not to the full extent that could potentially affect the function of the electric motor.

Particularly with respect to the movable masses of the piston with the working tool, e.g. the cutting die, on the one hand and the hydraulic cylinder and, if applicable, other parts such as a counter tool connected thereto on the other hand, the embodiment can preferably be realized in such a way that it is ensured that the collision between the piston and a corresponding limit stop or between the tool and the counter tool takes place prior to an abutment of the cylinder on the body device or an abutment of the transmission on the electric motor when the counterforce is discontinued (in the case of a cutting tool, e.g., upon an incipient brittle fracture of the part to be cut).

In the instant of the transection or a brittle fracture of the part to be cut, for example, at least one of the proposed solutions makes it possible to absorb so much energy that the drive of the hydraulic medium pump or the drive of a spindle or the like can no longer be significantly affected.

According to one solution, the connection between the transmission and the electric motor is realized by means of a pin, which is anchored in one of the components (i.e. transmission or electric motor) and relative to which the other component is movable, particularly slidable, in such a way that its motion is limited by a limit stop. In this case, the pin simultaneously provides a guide during the course of the displacement.

The limit stop may on the one hand be realized as a result of the direct abutment of the components on one another. A limit stop may also be realized by forming a head-like radial widening of the pin, wherein the component, which is movable relative to the anchored pin, can directly or indirectly abut on said head in a displacement position.

The movability of one component relative to the other component may be realized against a spring force. Accordingly, both components can on the one hand be automatically displaced back into their home position relative to one another, which is preferably limited by a limit stop, as a result of the spring force effect. On the other hand, the displacement of one component relative to the other component is dampened as a result of the spring force effect.

The spring may act between a pin head and a housing of one of the components. In this case, the pin head is formed in the region of the end of the pin, which lies opposite of the anchoring.

In a potential embodiment, the pin preferably is a screw. Accordingly, the anchoring is realized by screwing the pin into a housing section of one of the components. The screw head provides a supporting shoulder for the spring.

The movability of the transmission relative to the electric motor in the direction of the longitudinal axis may be realized over a displacement travel between a few tenths of a millimeter and a few millimeters, for example up to 5 tenths of a millimeter or 1 to 2 millimeter and, if applicable, up to 5 mm or more.

In another potential embodiment of the working tool, the hydraulic medium pump and/or the drive for the hydraulic medium pump may be arranged in the body device in the form of a successive arrangement, wherein the hydraulic cylinder is movable in the direction of the successive arrangement. The successive arrangement of the hydraulic medium pump and the drive defines the orientation of a geometric axis. The moving direction of the hydraulic cylinder may extend in the direction of this axis. In a preferred potential embodiment, the moving direction of the hydraulic cylinder extends parallel to the direction of travel of the hydraulic piston between a retracted position and an extended position.

The hydraulic cylinder may be movable in the direction of travel by 1 mm or more, e.g. by up to 5 or 10 mm or by up to 20 mm or more.

The working head with the hydraulic cylinder and the hydraulic piston may be arranged so as to be movable in the direction of travel, but inseparable from the body device at least in the course of normal use of the working tool. In an alternative embodiment, however, an operationally separable connection between the working head and the body device can be realized, e.g. as a result of a screw-type of plug-type connection. The connecting position may be secured, e.g., by means of a catch. The hydraulic cylinder as a component of the working head may be realized in such a way that it remains on the body device after the removal of the tools and the piston from the working head.

The hydraulic cylinder may comprise a connecting extension, which extends from the cylinder bottom opposite to the cylinder wall, wherein the hydraulic cylinder—and therefore preferably the entire working head—is movably accommodated in an adapter-like connecting receptacle of the body device by means of said connecting extension. The connecting extension may be fastened on the hydraulic cylinder rigidly and therefore immovably relative to the hydraulic cylinder, wherein the connecting extension may furthermore be realized, e.g., integrally with and of the same material as the hydraulic cylinder.

In a potential embodiment, a hydraulic medium channel extends through the connecting extension in its longitudinal direction, i.e. preferably in the direction of travel, wherein said hydraulic medium channel serves for transporting hydraulic medium into the cylinder chamber via the connecting receptacle and the channel in order to thereby act upon the hydraulic piston. The channel may extend centrally, e.g. along a geometric center axis of the connecting extension.

The connecting receptacle may accordingly form a hydraulic chamber, which can be supplied by the hydraulic medium pump.

The connecting extension may extend through a seal in the body device in order to tightly seal the hydraulic chamber on the receptacle side. A displacement of the hydraulic cylinder with its connecting extension relative to the connecting receptacle and therefore also relative to the seal may occur in the course of a working process, particularly in the instant of the transection of the part to be cut. The seal accordingly is designed for allowing this relative motion.

The connecting extension is realized with a form-fit projection, which is—viewed from the hydraulic cylinder— arranged on the other side of the seal that preferably cannot be displaced with respect to its position. This form-fit protection preferably extends in the hydraulic chamber being formed in the connecting receptacle. A limit stop for the hydraulic cylinder in the direction of travel, e.g. and preferably in the outwardly extending direction of travel, may be realized by means of the form-fit projection.

The form-fit projection may furthermore be realized in the form of a cross-sectional widening relative to the connecting extension, e.g. due to the arrangement of a screw nut or a so-called claw nut.

This also makes it possible to captively hold the hydraulic cylinder on the connecting receptacle, wherein said connecting receptacle may in turn be held in the body device in an operationally inseparable manner.

According to a potential embodiment, the hydraulic cylinder may be movable in the direction of travel against a spring force. In another embodiment, the hydraulic cylinder may alternatively or, in particular, additionally also be movable opposite to the direction of travel against a spring force. To this end, disk springs or disk spring assemblies may be provided, e.g., in the pressure chamber of the connecting receptacle for the interaction with the form-fit projection of the connecting extension and/or between the hydraulic cylinder and the facing limit stop surface of the body device or the connecting receptacle, respectively. In this way, a spring-loaded limit stop ("soft" limit stop) is realized in and/or opposite to the direction of travel.

The proposed invention may be combined with hydraulic damping of the hydraulic piston in accordance with DE 10 2015 119 372. The content of this patent application is hereby fully incorporated into the disclosure of the present invention, namely also for the purpose of incorporating characteristic features of this patent application into claims of the present invention.

BRIEF DESCRIPTION OF THE DRAWINGS

The invention is described in greater detail below with reference to the attached drawings that merely show exemplary embodiments. A component, which is only described with reference to one of the exemplary embodiments and in another embodiment not replaced with another component due to its specificity, is therefore also described as a potentially existing component for this other embodiment. In the drawings:

FIG. 2 shows the enlarged detail II in FIG. 1 concerning the interacting region of an electric motor and a transmission connected thereto;

FIG. 2A shows an alternative first embodiment of the hydraulic working tool;

FIG. 3 shows an illustration corresponding to FIG. 2, in which the transmission is moved relative to the electric motor in the direction of the longitudinal axis;

FIG. 4 shows a schematic sectional illustration, which essentially corresponds to FIG. 2, concerning a working device with a mechanical transmission;

FIG. 4A shows an alternate embodiment of the working device with a mechanical transmission of FIG. 4;

FIG. 5 shows a third embodiment in the form of an illustration corresponding to FIG. 1;

DESCRIPTION OF THE EMBODIMENTS

Figure 1:
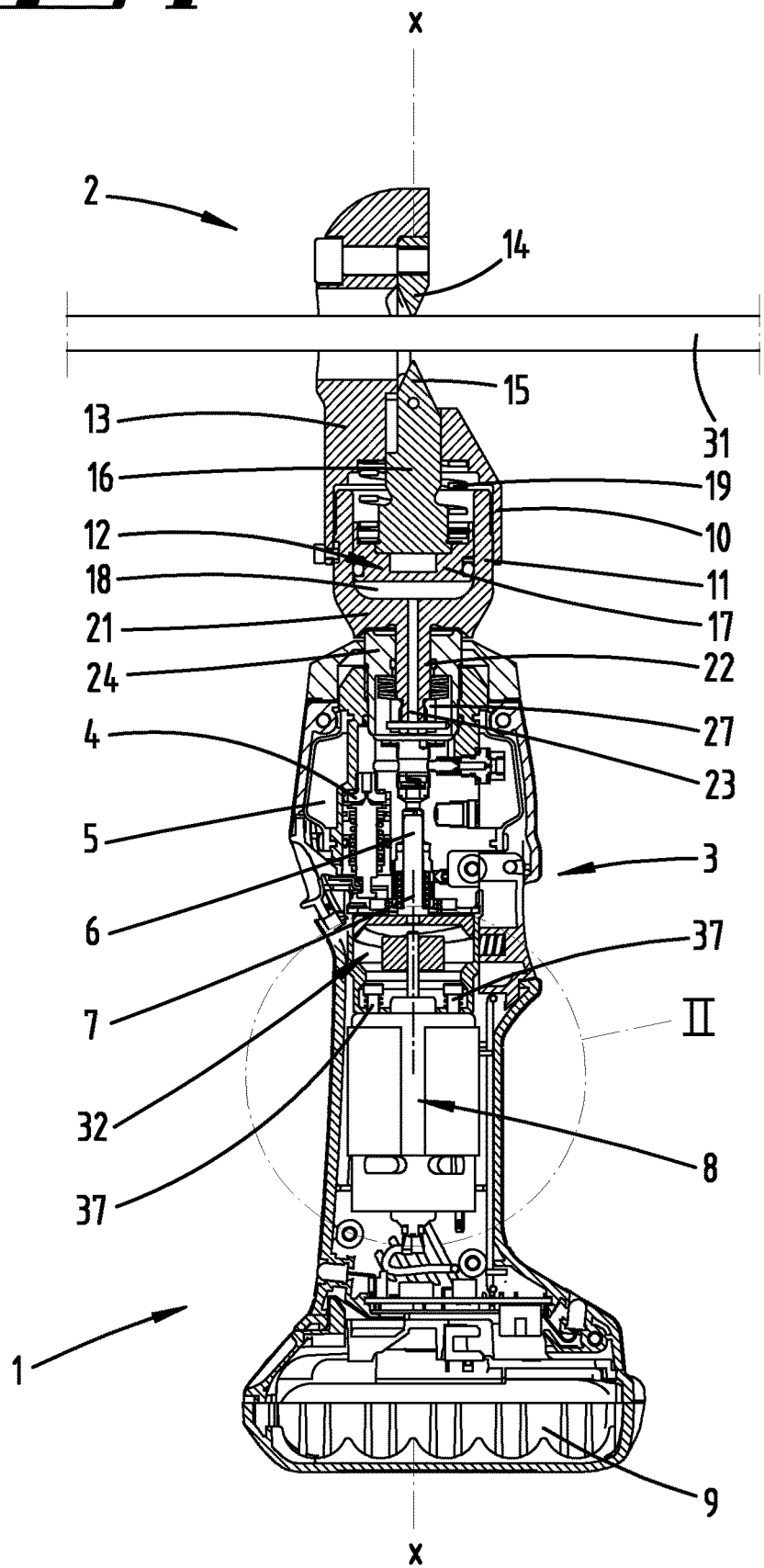
FIG. 1 shows a first embodiment of a hydraulic working tool in the form of a longitudinal section concerning a retracted position of the hydraulic piston, wherein the working head is realized in the form of a cutting head with a fixed cutting edge and a displaceable cutting edge.

A hydraulic working tool 1 suitable for one-handed operation, particularly an electrohydraulic working tool for actuating a working head 2, is initially described with reference to FIG. 1 and FIG. 5 (concerning another embodiment). The working head 2 may be realized in the form of a head that can be exchangeably held on the working tool 1 as shown. However, the head may likewise be inseparably connected to the tool. In the embodiment shown, the working head 2 is realized in the form of a cutting head. However, working heads 2 that are realized, for example, in the form of punching or pressing heads may also be arranged on the working tool 1.

The working head 2 according to this embodiment can be connected to a body device 3 of the working tool 1 in order to realize its hydraulic supply.

In the embodiment shown, the working head 2 preferably is divided into a working attachment, which is attached to a hydraulic cylinder 11 in an operationally separable manner, and the hydraulic cylinder 11, which preferably is attached to a body device 3 in an operationally inseparable manner. The working attachment essentially comprises a hydraulic piston 12, which is connected to a tool, and the counter tool.

The hydraulic working tool 1, particularly the body device 3, preferably consists of a basic device of the type illustrated and described in initially cited WO 2003/084719 A2 (U.S. Pat. No. 7,412,868 B2). The correlation with the object described in said WO publication, e.g. with regard to a return valve 4, a tank 5 and a pump tappet 6, can be gathered from the upper region of the body device 3 illustrated in FIG. 1. All in all, this correlation also shows that a hydraulic medium pump 7 and a drive 8 for the hydraulic medium pump 7 are provided in the body device 3 in the form of a successive arrangement. The electric supply of the drive 8, particularly the electromotive drive 8, is realized by means of an accumulator 9.

With respect to other details of the preferably used hydraulic working tool 1 or body device 3, we hereby refer to the full content of the aforementioned WO or US publication, namely also for the purpose of incorporating characteristic features with respect to the design of the working tool or the body device, which are described in said WO or US publication, into the claims of the present application.

In the exemplary embodiment shown, the working head 2 is connected to the body device 3 mechanically, as well as hydraulically, by means of a flange 10. To this end, the flange 10 is initially designed for being screwed to a hydraulic cylinder 11 for a hydraulic piston 12. The interacting region of the body device 3 and the working head is generally realized rotationally symmetrical to a longitudinal axis x.

The flange 10 comprises the wall of the hydraulic cylinder 11 and transforms into a holder 13, which is realized in a bow-shaped manner, on the side of the working head. In the exemplary embodiment shown, a counter tool in the form of a fixed cutting edge 14 is arranged on this holder 13.

Another movable cutting edge 15, which forms a tool, is arranged upstream in the direction toward the fixed cutting edge 14. The cutting edge 15 is coupled to the hydraulic piston 12 and accordingly also forms part of the working head 2.

Furthermore, the cutting edge 15 preferably can be displaced along the axis x together with the hydraulic piston 12, which accordingly can be displaced between a retracted position illustrated in FIG. 1 and an extended position in a direction of travel r extending in the axial direction.

The hydraulic piston 12 comprises a piston skirt 16 with a disk-shaped piston head 17, which faces away from the working region or the connecting region of the cutting edge 15 on the piston skirt 16.

The diameter of the piston head 17 is adapted to the inside diameter of the accommodating hydraulic cylinder 11. The piston head 17 forms an impingement surface for the hydraulic fluid, which is during the operation of the working tool 1 transported into the impingement chamber 18 formed in front of the impingement surface between the hydraulic cylinder 11 and the hydraulic piston 12.

The hydraulic piston 12 is subjected to a load in the direction of the retracted position according to FIG. 1, namely opposite to a direction of travel r resulting from a pressure increase in the impingement chamber 18. This is realized by providing a spring 19, e.g. a cylindrical pressure spring. The spring 19 is supported on the working head 2 in the region of the holder 13 with one end and acts upon the piston skirt 16 with its other end.

The hydraulic piston 12 is provided with a peripheral ring seal 20 on its circumference. This ring seal acts against the inner surface of the hydraulic cylinder wall (see also FIGS. 6-9).

A connecting extension 22 originates from the cylinder bottom 21 of the hydraulic cylinder 11 and extends opposite to the cylinder wall. This approximately spike-shaped connecting extension 22 preferably is arranged in the center of the cylinder bottom 21, particularly such that it centrally accommodates the axis x when the working tool is in use. The connecting extension 22 may be realized integrally with and of the same material as the hydraulic cylinder 11 as shown.

A hydraulic medium channel 23 centrally extends through the connecting extension 22 in the direction of the axis x, wherein one end of said hydraulic medium channel leads into the impingement chamber 18 and its other end leads into the free end face of the connecting extension 22.

The hydraulic cylinder 11 and therefore the entire working head 2 are accommodated in an adapter-like connecting receptacle 24 of the body device 3 by means of the connecting extension 22. The connecting receptacle 24 is in the operating state of the working tool 1 non-displaceably held in the body device 3, e.g. as a result of screw fastening.

The connecting extension 22 extends through the connecting receptacle 24 in the region of a receptacle opening 25, which is cross-sectionally adapted, but allows the relative displacement of the connecting extension 22 in the direction of travel r. A seal 26, e.g. in the form of a ring seal, is provided in the region of this receptacle opening 25. The free end of the connecting extension 22, which is formed by the hydraulic cylinder 11 on the other side of the seal 26, is provided with a form-fit projection 27, e.g. in the form of a claw part engaging on the connecting extension 22. The form-fit projection 27 extends in a pressure chamber 28, which is cross-sectionally enlarged relative to the cross section of the connecting extension 22, as well as the receptacle opening 25, transverse to the direction of the axis x.

The hydraulic medium pump 7 delivers hydraulic medium into this pressure chamber 28 and onward into the impingement chamber 18 for acting upon the hydraulic piston 12 through the hydraulic medium channel 23 leading into the pressure chamber 28.

In addition to the electric motor 8, the body device 3 furthermore comprises a transmission 32, wherein the electric motor and the transmission 32 are arranged in the form of a successive arrangement referred to the longitudinal axis x. In the first exemplary embodiment illustrated in FIGS. 1-3, the transmission 32 is realized in the form of a hydraulic pump.

According to the second exemplary embodiment illustrated in FIG. 4, the transmission 32 is a mechanical transmission, particularly a so-called planetary gearing with a sun wheel 39 that is directly driven by the electric motor 8 and meshes with radially outer planet wheels 40. In this embodiment, a spindle 41 is rotationally driven by the planet wheels 40. This spindle preferably extends in the direction of the longitudinal axis x.

A thusly designed body device 3 may serve, for example, for driving a working head 2 with pivotable cutting edges 42. Such a working tool is essentially known from initially cited WO 2014/009363 A1. With respect to the function of this working tool, particularly with respect to the interaction between the spindle and the cutting edges, the content of this application is hereby fully incorporated into the disclosure of the present invention, namely also for the purpose of incorporating characteristic features of this patent application into claims of the present invention.

Regardless of the respective embodiment (hydraulically or mechanically acting transmission 32), the transmission 32 is provided with a peripheral housing 34 and the associated electric motor 8 preferably is likewise provided with a peripheral housing 36.

The transmission 32 and the electric motor 8 are connected to one another by means of a pin connection, wherein a movability of the transmission 32 relative to the electric motor 8 is realized in the direction of the longitudinal axis x.

To this end, two pins 37 in the form of screws, which are arranged diametrically opposite of one another referred to the longitudinal axis x, are anchored in the ceiling 35 of the electric motor housing 36 in the embodiment shown. The pins extend through the associated housing bottom 33 of the transmission 32 in the region of correspondingly positioned and dimensioned bores.

The transmission 32 is guided in the longitudinal direction of the axis x on the pin 37 extending through the bottom 33.

In an unaffected home position according to the illustrations in FIGS. 2 and 4, the housing bottom 33 of the transmission 32 preferably abuts on the ceiling 35 of the electric motor 8 in such a way that its motion is limited by a limit stop. The driveshaft 43 of the electric motor 8 likewise extends through the ceiling 35, as well as the bottom 33 of the transmission 32, in order to engage into the transmission region.

In the instant of the complete transection of a material 31 to be cut or a brittle fracture of the material 31 to be cut, the resulting linearly successive arrangement of the assemblies may cause a sudden load, particularly on the electric motor and/or the transmission, which may even lead to a malfunction.

In order to counteract such a load on the transmission 32 and/or the electric motor 8, the transmission 32 is able to move relative to the electric motor 8 in the direction of the longitudinal axis x. This relative movability is achieved as a result of the provided pins 37, the pin heads of which protrude into the housing interior of the transmission 32 and are axially spaced apart from the facing surface of the housing bottom 33 of the transmission 32 in such a way that a corresponding displaceability is realized.

A spring 38 is provided between the each pin head and the facing housing bottom 33 of the transmission 32, wherein said spring may be realized, for example, in the form of a cylindrical pressure spring that surrounds the pin 37 as shown.

FIG. 3 shows an example of an intermediate position in the course of a relative displacement between the electric motor 8 and the transmission 32 in a hydraulically acting coupling.

This displacement accordingly takes place against the force of the springs 38, which displace the transmission 32 back into the home position.

The hydraulic cylinder 11 may be movable in the connecting receptacle 24 by means of the connecting extension 22 and therefore movable relative to the body device 3 in the direction of the axis x and consequently also in the direction of travel r, as well as opposite to the direction of travel r, in such a way that its motion is limited by a limit stop (see the additional embodiment in FIGS. 6-9). The limit stop in the direction of travel r is realized as a result of the interaction of the form-fit projection 27 on the extension side with the connecting receptacle 24. A limit stop opposite to the direction of travel r is realized as a result of the interaction between the hydraulic cylinder 11, particularly the cylinder bottom 21, and the facing end face of the body device 3, particularly the connecting receptacle 24. A movability along the axis x by a 1 mm or more, e.g. 3 to 6 mm, can thereby be realized.

The respective limit stop preferably is spring-loaded as shown. To this end, a spring 29 is provided in the pressure chamber 28, e.g., between the form-fit projection 27 and the facing surface of the connecting receptacle 24 and, for example, encompasses the connecting extension 22. The spring may be realized, e.g., in the form of a cylindrical pressure spring or a disk spring assembly.

Another spring 30, which may likewise be realized, e.g., in the form of a cylindrical pressure spring or a disk spring assembly, is arranged between the cylinder bottom 21 and the facing end face of the connecting receptacle 24 such that it encompasses the connecting extension 22.

The illustrations in FIGS. 6-9 show a sequence in the course of a cutting process. The material 31 to be cut in the form of a wire extends between a fixed cutting edge 14 and a displaceable cutting edge 15.

Figure 6:
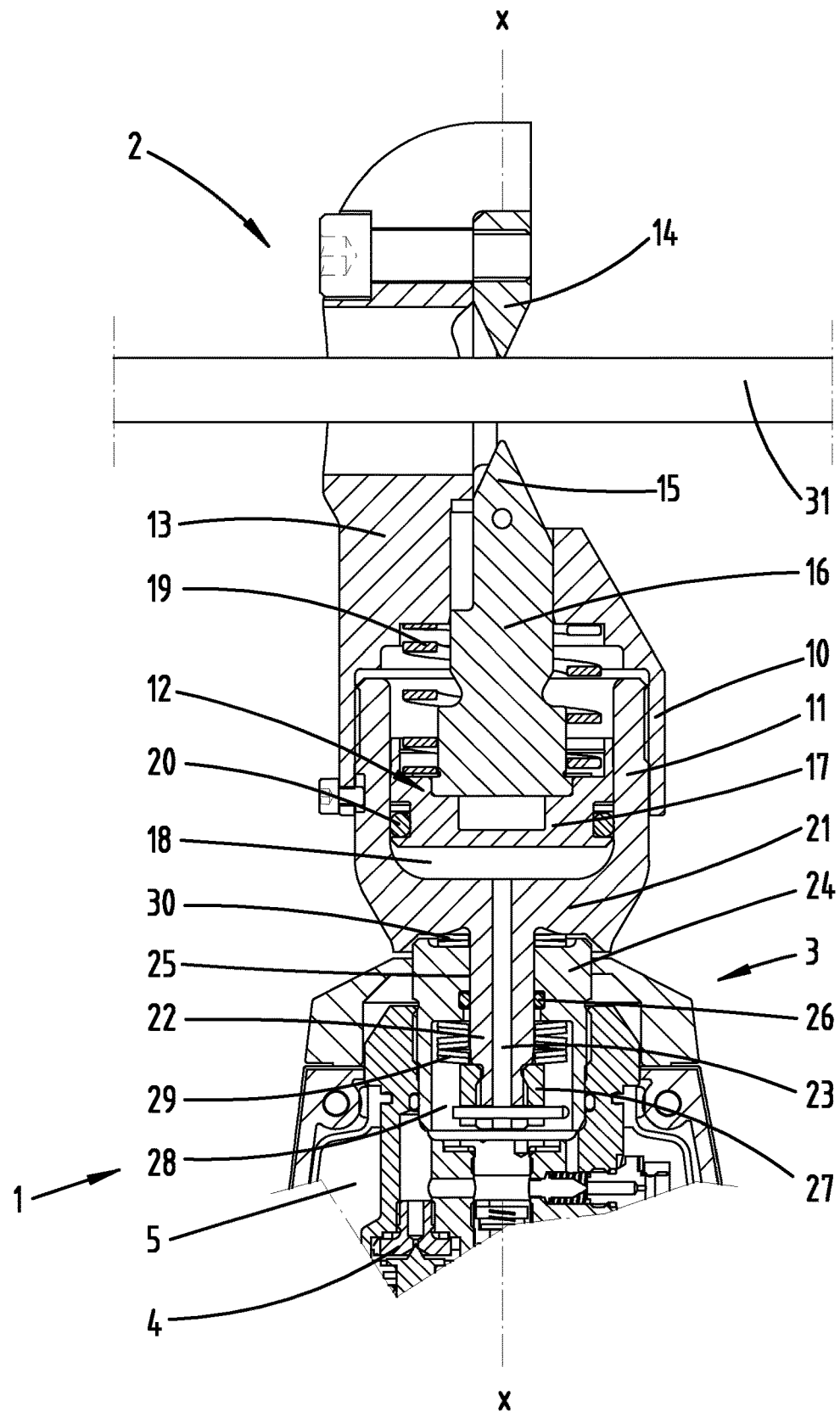
FIG. 6 shows the enlarged detail VI in FIG. 5.

In the retracted position of the hydraulic piston 12 illustrated in FIG. 6, in which the hydraulic piston is not hydraulically acted upon, the hydraulic cylinder 11 is in a stopping position relative to the body device 3, particularly the connecting receptacle 24.

The activation of the hydraulic medium pump 7 and the associated transport of hydraulic medium into the impingement chamber 18 result in a displacement of the hydraulic piston 12 and thereby the cutting edge 15 in the direction of travel r.

Figure 7:
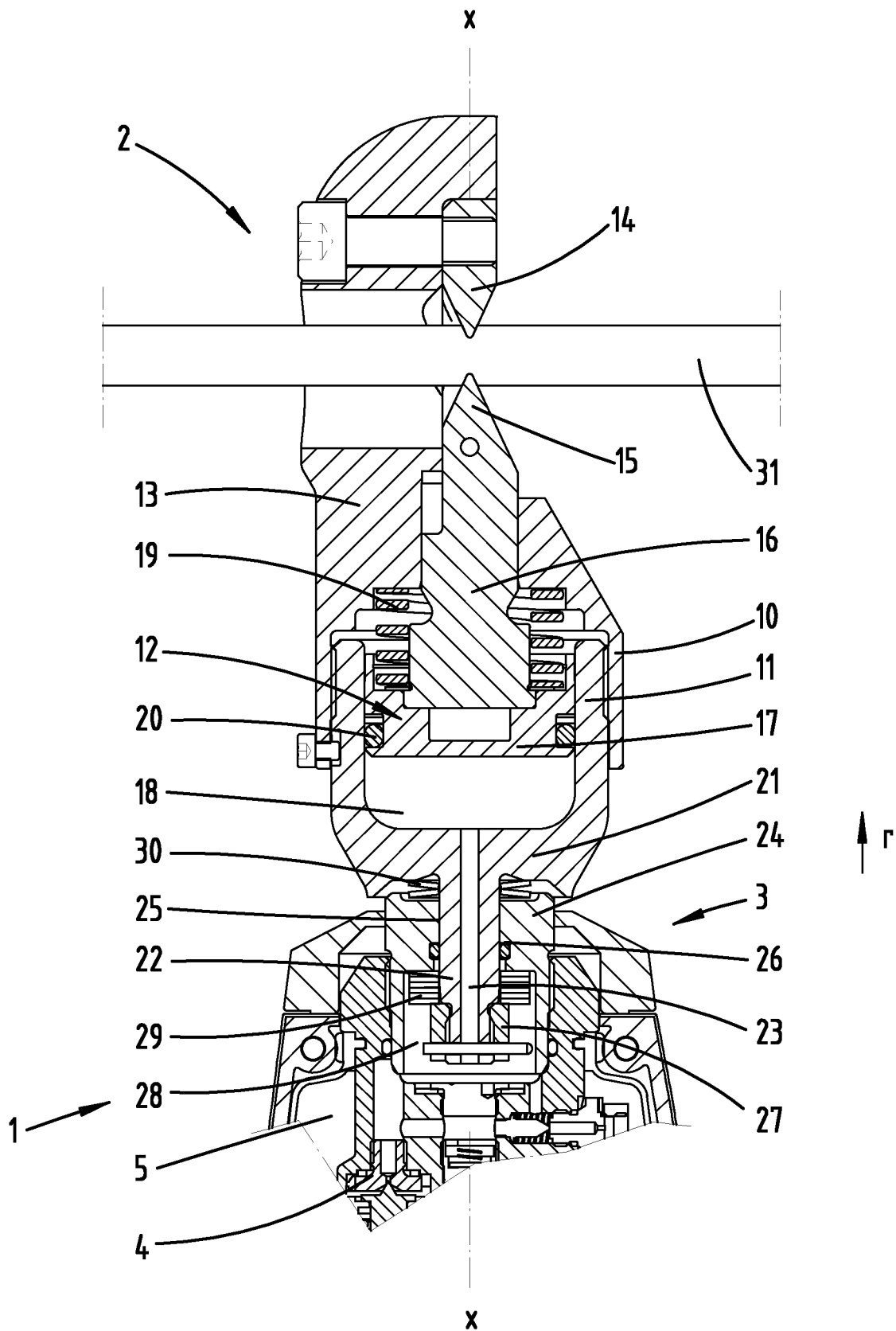
FIG. 7 shows a follow-up illustration to FIG. 6 concerning an intermediate position in the course of a cutting process.
Figure 8:
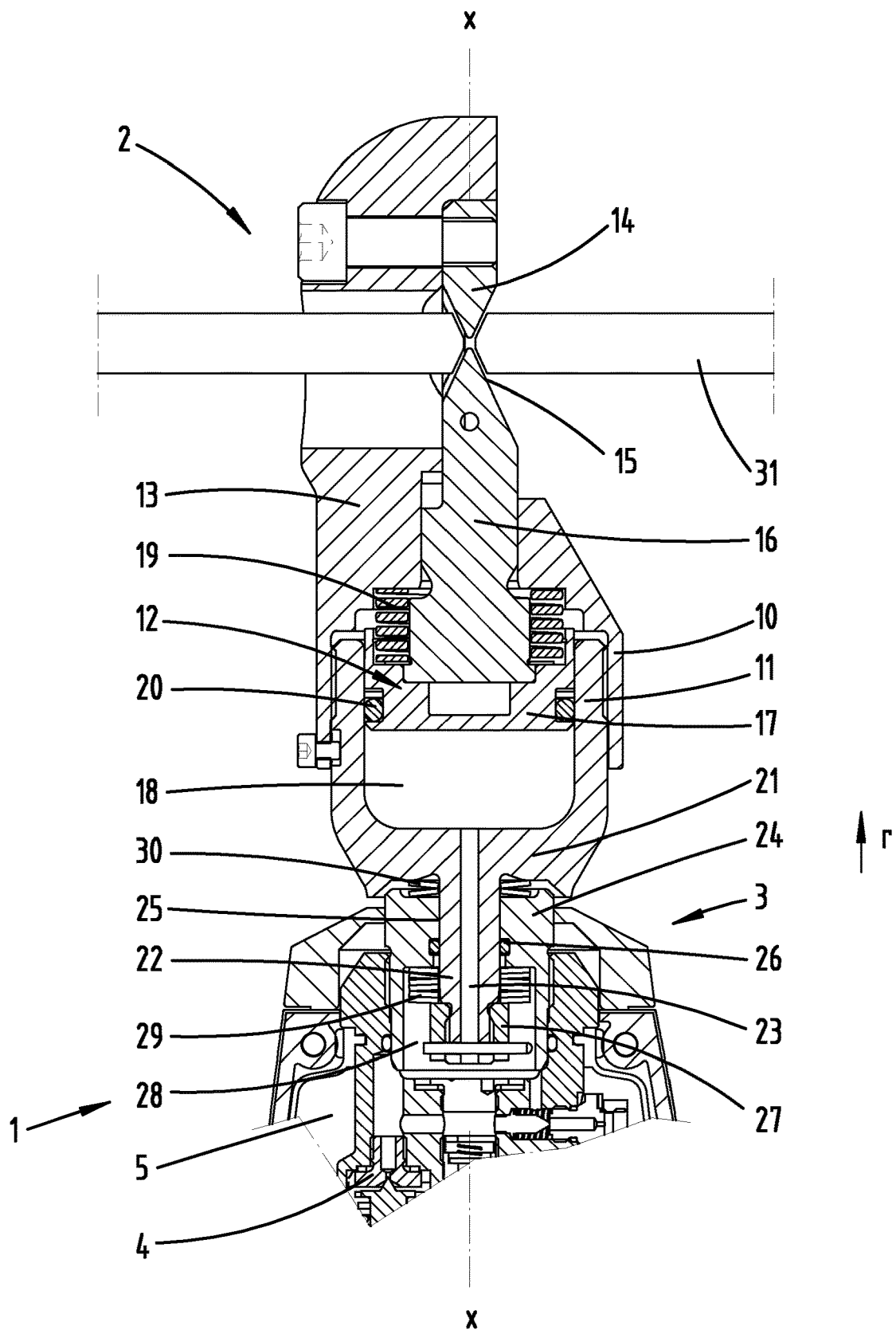
FIG. 8 shows a follow-up illustration to FIG. 7 concerning a fracture situation in the course of the cutting process.

In the course of the pressure buildup, the hydraulic cylinder 11 also moves in the direction of travel r together with the working head 2 by overcoming the restoring force of the spring 29, if applicable as far as an (intermediate) stopping position between the form-fit projection 27 and the connecting receptacle 24, in which the spring 29 is compressed (see FIG. 7).

Figure 9:
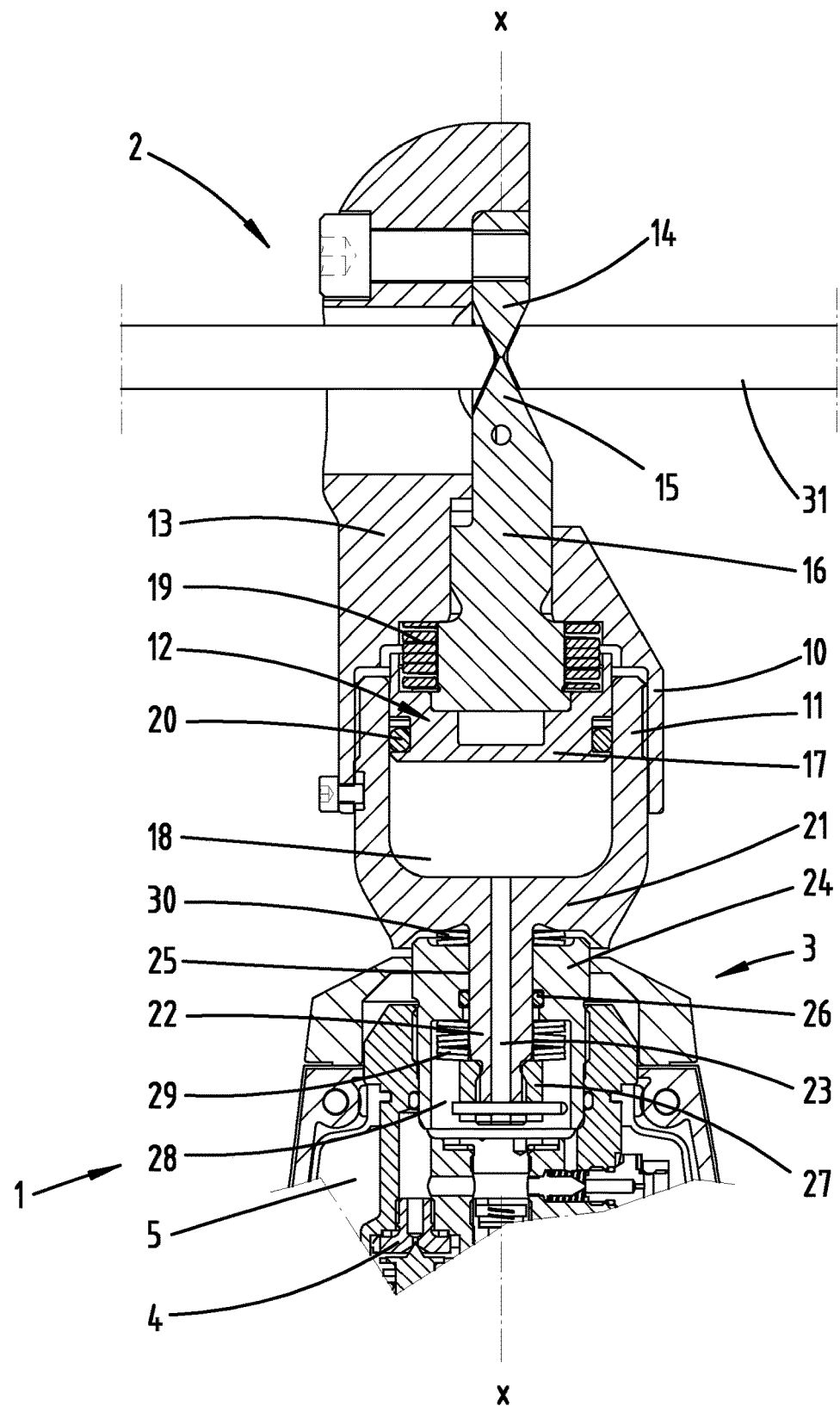
FIG. 9 shows a follow-up illustration to FIG. 8 concerning a stopping situation.

As the counterforce on the material 31 to be cut discontinues upon the transection of the material 31 to be cut or a brittle fracture thereof, the hydraulic piston 12 and the cutting edge 15 fastened thereon carry out a sudden motion toward the opposite fixed cutting edge 14 in the direction of travel r due to the previously acting high pressure. This can lead to a collision of the cutting edges, 14 and 15 as illustrated in FIG. 9. However, a limit stop of the piston skirt 16 on the holder 13 preferably is reached before a collision of the cutting edges occurs.

Due to the high hydraulic pressure, which at least briefly continues to act in the hydraulic cylinder 11, the hydraulic cylinder 11 also has a tendency to move in the direction of the body device 3 opposite to the direction of travel r. After the collision of the cutting edges, the working head 2 ultimately abuts on the facing end face of the body device 3 by means of the hydraulic cylinder 11, preferably while compressing the intermediately arranged spring 30.

The preceding explanations serve for elucidating all inventions that are included in this application and respectively enhance the prior art independently with at least the following combinations of characteristic features, namely:

A working tool, which is characterized in that the transmission 32 is connected to the electric motor 8 so as to be movable in the direction of the longitudinal axis x in such a way that its motion is limited by a limit stop.

A working tool, which is characterized in that the connection is realized by means of a pin 37, which is anchored in one of the components 8, 32 and relative to which the other component 8, 32 is movable in such a way that its motion is limited by a limit stop.

A working tool, which is characterized in that the movability is realized against a spring force.

A working tool, which is characterized in that the spring 38 acts between a pin head and a housing 34 of one of the components 8, 32.

A working tool, which is characterized in that the pin 37 is a screw.

A hydraulic working tool, which is characterized in that the hydraulic cylinder 11 is attached to the body device 3 so as to be movable in the direction of travel r in such a way that its motion is limited by a limit stop.

A hydraulic working tool, which is characterized in that the hydraulic medium pump 7 and/or the drive 8 for the hydraulic medium pump 7 are arranged in the body device 3 in the form of a successive arrangement, and in that the hydraulic cylinder 11 is movable in the direction of the successive arrangement.

A hydraulic working tool, which is characterized in that the hydraulic cylinder 11 is movable in the direction of travel r by 1 mm or more.

A hydraulic working tool, which is characterized in that the hydraulic cylinder 11 comprises a connecting extension 22, which extends from the cylinder bottom 21 opposite to the cylinder wall, wherein the hydraulic cylinder 11 is movably accommodated in a connecting receptacle 24 of the body device 3 by means of said connecting extension.

A hydraulic working tool, which is characterized in that the connecting extension 22 extends through a seal 26 in the body device 3.

A hydraulic working tool, which is characterized in that the connecting extension 22 is realized with a form-fit projection 27, which is viewed from the hydraulic cylinder 11 arranged on the other side of the seal 26.

A hydraulic working tool, which is characterized in that the form-fit projection 27 is realized in the form of a claw part engaging on the connecting extension 22.

A hydraulic working tool, which is characterized in that the hydraulic cylinder 11 is movable in the direction of travel r against a spring force.

A hydraulic working tool, which is characterized in that the hydraulic cylinder 11 is movable opposite to the direction of travel r against a spring force.

All disclosed characteristic features are essential to the invention (individually, but also in combination with one another). The disclosure content of the associated/attached priority documents (copy of the priority application) is hereby fully incorporated into the disclosure of this application, namely also for the purpose of integrating characteristic features of these documents into claims of the present application. The characteristic features of the dependent claims characterize independent inventive enhancements of the prior art, particularly for submitting divisional applications on the basis of these claims.

LIST OF REFERENCE SYMBOLS

1 Working tool
2 Working head
3 Body device
4 Return valve
5 Tank
6 Pump tappet
7 Hydraulic medium pump
8 Electric motor
9 Accumulator
10 Flange
11 Hydraulic cylinder
12 Hydraulic piston
13 Holder
14 Fixed cutting edge
15 Cutting edge
16 Piston skirt
17 Piston head
18 Impingement chamber
19 Spring
20 Ring seal 21 Cylinder bottom
22 Connecting extension
23 Hydraulic medium channel
24 Connecting receptacle
25 Receptacle opening
26 Seal
27 Form-fit projection
28 Pressure chamber
29 Spring
30 Spring
31 Material to be cut
32 Transmission
33 Bottom
34 Housing
35 Ceiling
36 Housing
37 Pin
38 Spring
39 Sun wheel
40 Planet wheel
41 Spindle
42 Cutting edge
43 Driveshaft
r Direction of travel
x Longitudinal axis

The invention claimed is:

1. A working tool comprising:
a working head;
a body device;
an electric motor mounted within a motor housing arranged in the body device, the motor housing having a ceiling, the electric motor including a drive shaft defining a longitudinal axis, the drive shaft extending through the ceiling; and
a transmission mounted within a transmission housing arranged in the body device, the transmission housing having a bottom, the transmission is connected to the electric motor by the drive shaft extending through the bottom of the transmission housing and being engaged with the transmission,
wherein the transmission is movable in a direction of travel parallel to the longitudinal axis of the drive shaft, wherein the ceiling of the motor housing is spaceable from the bottom of the transmission housing for reaching a first position, and movement of the transmission is limited by a limit stop formed when the bottom of the transmission housing abuts the ceiling of the motor housing in a second position.

2. The working tool according to claim 1, further comprising a pin coupling the electric motor and the transmission together.

3. The working tool according to claim 1, further comprising a spring acting against the transmission away from the limit stop.

4. The working tool according to claim 1, further comprising
a pin coupling the electric motor and the transmission together, the pin having a pin head; and
a spring positioned between the pin head and one of the motor housing and the transmission housing.

5. The working tool according to claim 4, wherein the pin is a screw having a threaded section at one end.

6. The working tool according to claim 1, wherein the working head comprises a hydraulic cylinder and a hydraulic piston, the hydraulic cylinder being attached to the body device and displaceable between a retracted position and an extended position in the direction of travel, wherein the transmission comprises a hydraulic medium pump and further comprising a limit stop which limits movement of the hydraulic cylinder relative to the body device.

7. The working tool according to claim 6, wherein the hydraulic medium pump and the electric motor are arranged in the body device in a successive arrangement, wherein the hydraulic medium pump is movable in a direction of the successive arrangement.

8. The working tool according to claim 6, wherein the hydraulic cylinder is movable in the direction of travel by 1 mm or more.

9. The working tool according to claim 6, wherein the hydraulic cylinder comprises a connecting extension extending from a bottom of the cylinder, wherein the hydraulic cylinder is movably positioned within a connecting receptacle of the body device by the connecting extension.

10. The working tool according to claim 9, wherein the connecting extension extends through a seal in the body device.

11. The working tool according to claim 10, wherein the connecting extension is a form-fit projection, which is viewed from the hydraulic cylinder arranged on the other side of the seal.

12. The working tool according to claim 11, wherein the form-fit projection is a claw part engaging on the connecting extension.

13. The working tool according to claim 6, wherein the hydraulic cylinder is movable in the direction of travel against a spring force.

14. The working tool according to claim 6, wherein the hydraulic cylinder is movable opposite to the direction of travel against a spring force.

15. The working tool according to claim 7, wherein the hydraulic cylinder comprises a connecting extension extending from a bottom of the cylinder, wherein the hydraulic cylinder is movably positioned within a connecting receptacle of the body device by the connecting extension.

16. The working tool according to claim 7, wherein the hydraulic cylinder is movable in the direction of travel against a spring force.

17. The working tool according to claim 7, wherein the hydraulic cylinder is movable opposite to the direction of travel against a spring force.

18. A working tool comprising:
a working head;
a body device;
an electric motor mounted within a motor housing arranged in the body device, the motor housing having a ceiling, the electric motor including a drive shaft defining a longitudinal axis, the drive shaft extending through the ceiling; and
a transmission mounted within a transmission housing arranged in the body device, the transmission housing having a bottom, the transmission is connected to the electric motor by the drive shaft extending through the bottom of the transmission housing and being engaged with the transmission,
wherein the transmission is movable in a direction of travel parallel to the longitudinal axis of the drive shaft, wherein the ceiling of the motor housing is spaceable from the bottom of the transmission housing for reaching a first position, and movement of the transmission is limited by a limit stop formed when the bottom of the transmission housing abuts the ceiling of the motor housing in a second position;
a pin coupling the electric motor and the transmission together, the pin extending through the bottom of the transmission housing and guiding the transmission in a direction parallel to the longitudinal; and a spring acting against movement of the transmission away from the limit stop.

19. The working tool according to claim 18, wherein the pin has a pin head, and the spring acts between the pin head and one of the motor housing and the transmission housing.

* * * * *

UNITED STATES PATENT AND TRADEMARK OFFICE
CERTIFICATE OF CORRECTION

PATENT NO. : 11,285,596 B2
APPLICATION NO. : 16/339609
DATED : March 29, 2022
INVENTOR(S) : Frenken et al.

It is certified that error appears in the above-identified patent and that said Letters Patent is hereby corrected as shown below:

In the Claims

In Column 13, Claim 18, Line 2, delete "longitudinal;" and insert -- longitudinal axis; --, therefor.

Signed and Sealed this
Thirty-first Day of May, 2022

*Katherine Kelly Vidal*

Katherine Kelly Vidal
*Director of the United States Patent and Trademark Office*